United States Patent [19]

Stegherr

[11] Patent Number: 4,834,153

[45] Date of Patent: May 30, 1989

[54] AUTOMATIC DRILLING AND DOWELLING APPARATUS

[76] Inventor: Ludolf Stegherr, Donaustaufer Strasse 30, 8400 Regensburg, Fed. Rep. of Germany

[21] Appl. No.: 144,067

[22] Filed: Jan. 15, 1988

[30] Foreign Application Priority Data

Jan. 15, 1987 [DE] Fed. Rep. of Germany ... 8700668[U]
Mar. 14, 1987 [DE] Fed. Rep. of Germany ... 8703866[U]
May 21, 1987 [DE] Fed. Rep. of Germany ....... 3717129

[51] Int. Cl.⁴ .............................................. B27C 9/00
[52] U.S. Cl. .................................. 144/3 R; 29/525.1; 144/353; 156/513
[58] Field of Search ............. 144/3 R, 353; 29/526 R; 156/510, 513, 514, 578

[56] References Cited

U.S. PATENT DOCUMENTS

| 3,099,301 | 7/1963 | Bennett | 144/353 |
| 3,992,767 | 11/1976 | Lewis | 144/353 |
| 4,420,358 | 12/1983 | Kinot et al. | 144/353 |

*Primary Examiner*—W. Donald Bray
*Attorney, Agent, or Firm*—Hoffman, Wasson, Fallow & Gitler

[57] ABSTRACT

For automatically drilling boreholes within halving joints and frame portions of lattice windows, ejecting glue into said boreholes and inserting dowels, units are proposed, which consist of three dowel inserting devices and three associated glue injecting devices each being operable individually and simultaneously, and which are arranged according to the borehole pattern within the face of a halving joint. For disposing the dowels in magazines and for inserting said dowels into the boreholes in a controlled manner changeable magazines are proposed the bottom of which is arranged above a dowel receiving head and the dowel discharge location is associated to the receiving locations of the dowel receiving head; in this position dowels are transferred into the recesses of the dowel receiving head and are arranged in the discharge position from which they are inserted by means of dowel ejectors into aligned boreholes of a workpiece.

28 Claims, 7 Drawing Sheets

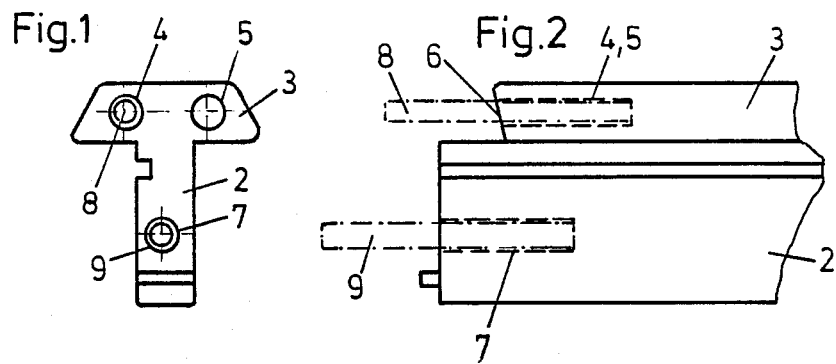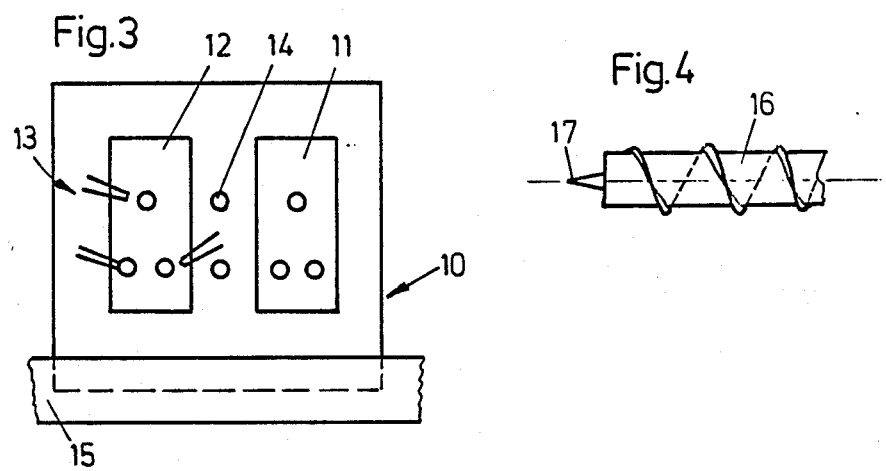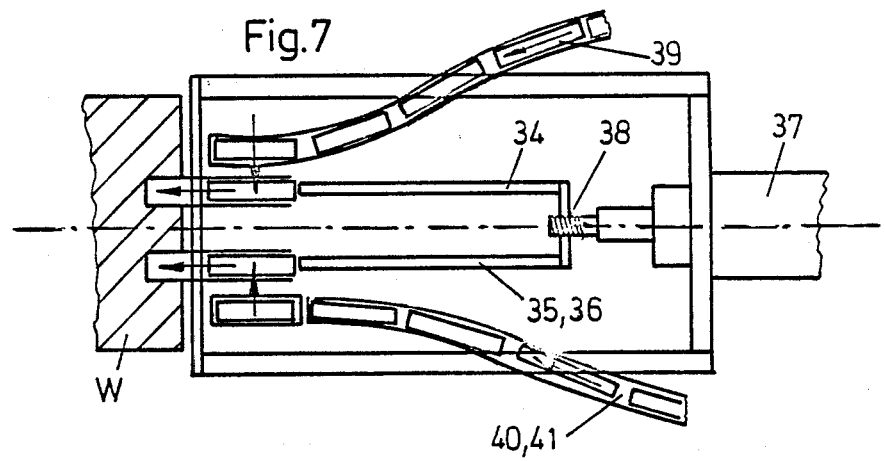

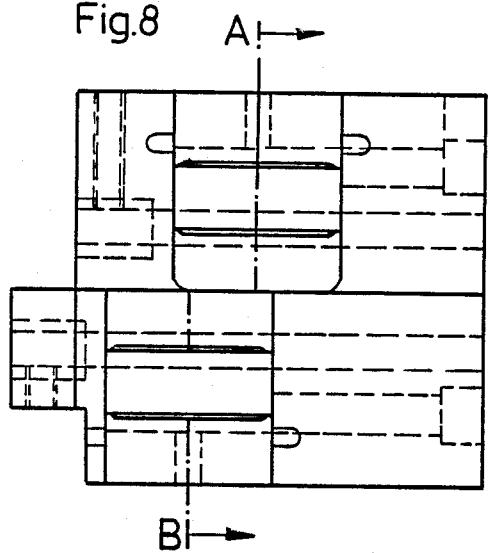
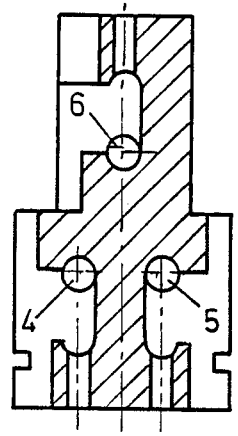
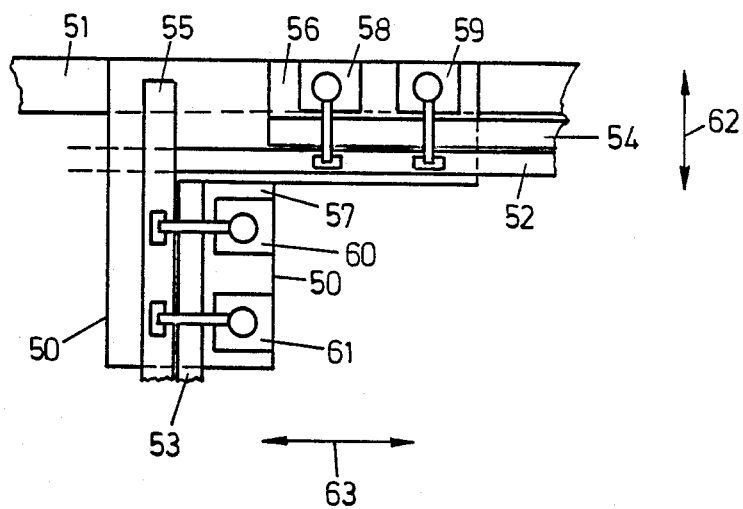

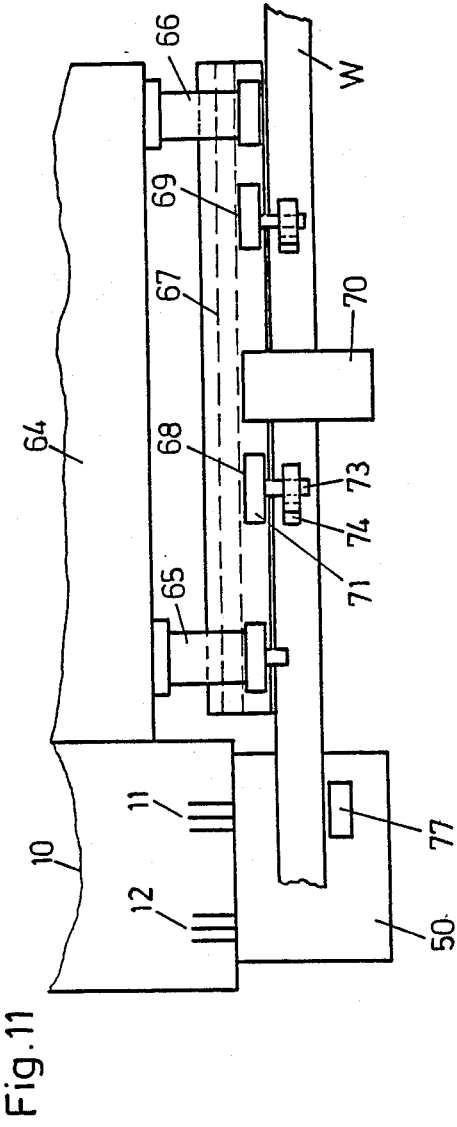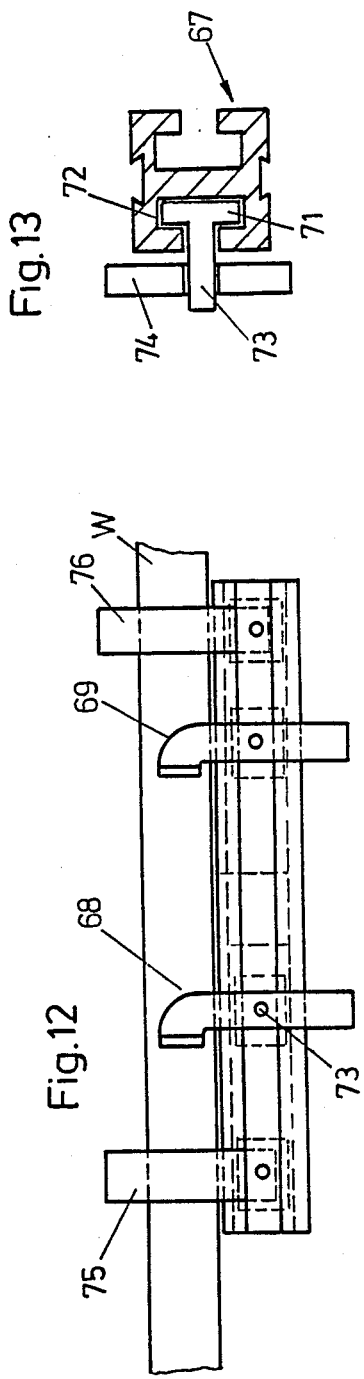

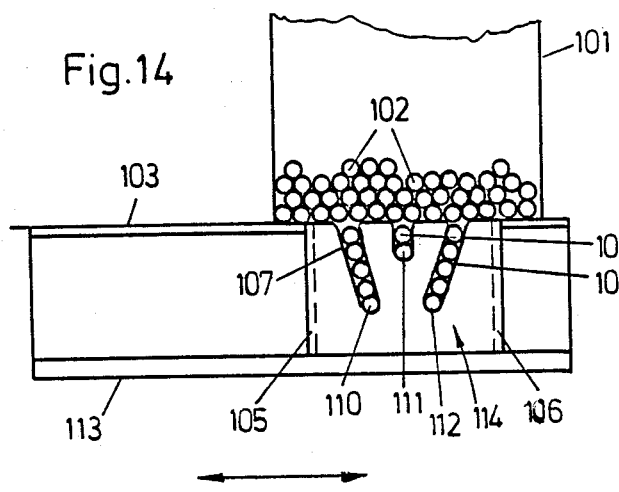
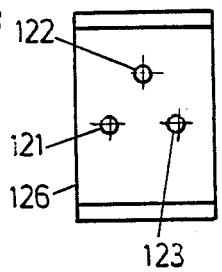
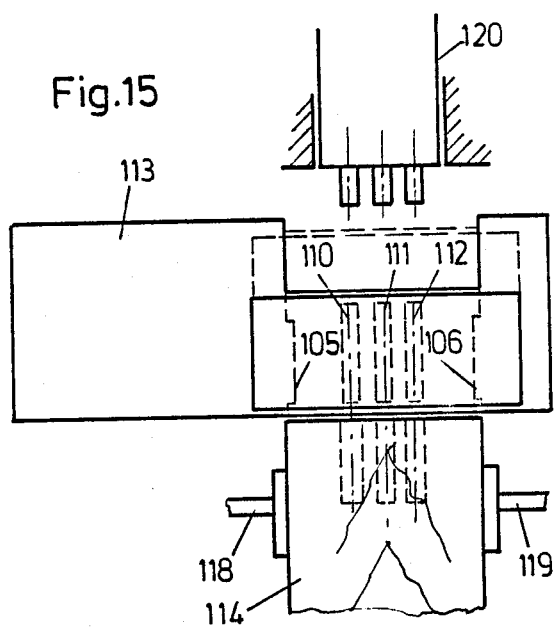
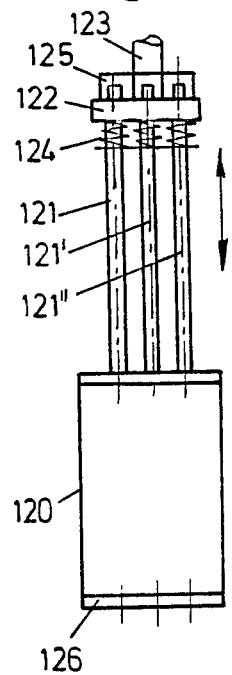

AUTOMATIC DRILLING AND DOWELLING APPARATUS

BACKGROUND OF THE INVENTION

This invention refers to the drilling and setting of dowels to be inserted into boreholes of wooden halving joint components or similar lattice frame portions for windows, doors, etc., to multiple drilling and dowelling devices, and to means for automatically preparing boreholes within such frame portions.

Halving joints of lattice frame windows are joined with the frame portions by means of wooden dowels. Up to now, this has been effected by drilling boreholes into the halving joints and into the associated positions of the frame portions, applying glue onto the inner surfaces of the boreholes, manually and individually inserting said dowels into the boreholes, and bonding said dowels within said boreholes. This requires a considerable expenditure of work and time, and it does not allow one to integrate the dowelling operation into the production of lattice frame windows on a production line.

In the field of making furniture it is known to drill boreholes for dowels in connecting portions automatically, to inject glue into the boreholes and to insert dowels therein; the connecting portions are fastened with plates or the like, whereby one unit each of a dowel device includes one driller, one glue spraying means and one associated dowel setting means. If several dowels parallel to each other are required, individual devices will be arranged side by side, the minimum distance of two adjacent devices being determined by the structural dimensions of the individual devices so that a predetermined minimum distance will be necessary. So far as it concerns halving joints for lattice frame windows with substantially T-like cross section, and with a rather small distance between two adjacent dowels, individual devices cannot be added one adjacent to the other, because the minimum distance of the boreholes of the two individual devices is substantially wider than the distance between two adjacent boreholes of one halving joint.

It is also known in the field of making lattice frame windows to drill one borehole per face of the halving joint and to set the corresponding dowel mechanically. However, this method cannot be used for simultaneously drilling, glueing and dowelling several dowels.

It is an object of this invention in combination with automatically drilling multiple dowel boreholes into halving joints and the associated frame portions of lattice frame windows to drill several boreholes of one joint simultaneously, to apply glue into all boreholes of one joint automatically and simultaneously, and immediately subsequent thereto to insert all dowels required for this joint simultaneously and automatically.

Furthermore, it is an object of this invention, to dispose dowels or similar cylindrical connecting elements, to insert them into frame portions to be connected to each other or in general to position them so that they can be inserted into workpieces in an exact position, to store the dowels within magazines temporarily and to fill said magazines with dowels in a reliable and economical manner.

SUMMARY OF THE INVENTION

The present invention proposes a system consisting of at least two dowel inserting devices and at least two glue injecting devices, to associate one dowel inserting device to one glue injecting device, and to operate all dowel inserting devices and all glue injecting devices separately and simultaneously.

This system allows one to drill the multiple dowel boreholes within halving joints (workpieces) or alternatively by another operation step the multiple dowel boreholes within the corresponding frame portions in one step, and subsequent thereto to automatically shift the halving joints or alternatively the frame portions a predetermined distance between the drilling device and the dowel device, to apply the glue simultaneously and automatically to the boreholes at the dowel device through glue injection devices, and to insert all dowels for joining one face of a halving joint with a frame portion, preferably three dowels, in one step, and simultaneously into the drilled boreholes of the halving joint or alternatively the frame portion. Glue is injected into the boreholes laterally with respect to the longitudinal axis of the device immediately before setting the dowels. The workpieces moving between the drilling device and the dowelling device may pass a blow-out device, which cleans off the dust generated by the drilling step within the boreholes before the workpieces arrive at the dowelling device.

This results in a substantially higher production speed compared with known devices setting the dowels manually, because this system allows one to glue and set the dowels fully automatically and with high speed, can be integrated in an automatic production line for lengthening and profiling the halving joints, drilling the boreholes and setting the dowels in a continuous operation, and allows one to obtain sufficiently small dowel distances in order to be able to set three dowels within the face of a halving joint, which are symmetrically arranged in the main dowel plane and are staggered with respect to each other. The dowels are passed through hoses (made from plastic material) from a supply source into the dowel device; the driving means for feeding the dowels can be a vibrating drive. In order to ensure that the dowels arrive simultaneously at all boreholes of one joint, each dowel location is connected with a separate hose. The dowels are lifted individually and simultaneously into an operating position at the outlet of each hose and are maintained in this position, in which they are axially aligned with a driving rod and also with the associated borehole of the halving joint. By actuating the dowel driving rods all dowels of one joint location are inserted in an axial direction into the corresponding borehole simultaneously; the drive can be a pneumatic, a hydraulic, a mechanical (spring-operated) or an electromagnetic drive actuating all driving rods in common. The drive for the dowel driving rods and the actuating means for injecting the glue are coupled in such a manner that the time difference between glue injection and dowel insertion is a minimum and that both steps do not overlap.

The exact positioning of the workpieces for the drilling the glueing and the dowelling operation is controlled by adjusting stops attached to a sliding table, which is movably guided on the machine. The stops are adjustable and are coupled to hold-down elements, which attach the workpiece to the stops for the drilling and dowelling step. Because the workpieces are as well halving joints to be drilled and dowelled at their faces as frame portions the boreholes of which extend transverse to the longitudinal axis of said frame portions, longitudinal and transverse stops are required in order to be able to change over in a simple manner.

If the machine comprising the multiple drilling and dowelling system according to this invention merely is to be used for the drilling of workpieces, the dowel device is switched off and a longitudinal stop bar is attached to the machine frame, which carries the workpiece to be drilled. The stop bar is provided with continuously adjustable stops, which operate mechanically or digitally. For this purpose the stop bar preferably is a profile bar within the longitudinal guides of which the stops are guided so that they can be shifted in length and can be positioned.

According to a further embodiment of this invention the dowels are filled into magazines, one of the filled magazines is inserted into the machine, the bottom of the magazine is placed at the top of and aligned with a dowel receiving head and the dowel discharge location is associated with the receiving location of the dowel receiving head, dowels are passed into cut-outs of the dowel receiving head and brought into the discharge position, and the dowels in their discharge position are inserted into the corresponding, aligned boreholes within the workpiece by means of a dowel ejector.

Dowels, as they are for example used for frame portions of wooden windows, or similar cylindrical or pin-like elements of wooden or plastic material or even metal are stored in dowel magazines the dimensions of which correspond with the diameter and the length of the dowels, which means that different magazines are used for dowels of predetermined length and/or diameter. These magazines are provided with a bottom wall, which is removed, for example withdrawn from the magazine when ready for operation so that the dowels are discharged downwards based on their weight or the weight of the sum of the dowels above. With a different embodiment the bottom can be stationary having gap-like outlets for the dowel discharge, and thus for example can be of hopper-like structure with one or several outlets. The magazine is exchangeable, especially in that the magazine casing can be releasably attached, e.g. screwed to the machine frame so that it can be exchanged against a different magazine for example an empty magazine can be replaced by a full one or a magazine of predetermined dowel type can be replaced by a magazine with another type of dowels.

Below the magazine a dowel receiving head or alternatively a dowel insert is provided, which receives dowels from the magazine and positions them within the dowel receiving head in such a manner that they are exactly aligned with the position of the boreholes of the required pattern of boreholes, drilled into the workpieces to be connected with each other for receiving the dowels. This position also is aligned with the ejecting rods of the dowel ejector, which force the dowels out of the dowel receiving head into the associated boreholes.

The dowel receiving head, the magazine and the dowel ejector are exchangeable in order to allow an adaption to different types of dowels (of different diameters and different length). Preferably the dowel receiving head is formed as a plug device and is provided within rails or guides on a pusher, which can be shifted below the magazine together with the dowel receiving head transverse to the longitudinal axis of the dowels. The pusher preferably is a bar or a ledge, which is shiftable into the dowel transfer position and away from it, timed with the setting of the dowels. This movement secures the exact transfer of dowels from the magazine into the dowel receiving head, and the pusher can be adjusted to different positions of borehole patterns. The pusher is driven by driving means with a controlled stroke for performing a rockable movement, which is to shift the dowel receiving head relative to the dowel magazine so that the individual dowels will be able to roll into the slots of the dowel receiving head downwards into the transfer position and so as to prevent two adjacent dowels from jamming against each other with the risk that none of them will move into the corresponding slot of the dowel receiving head. The dowel ejector is fastened to the machine frame. The ejector rods, the number and position of which corresponds to the dowel ejector positions of the dowel receiving head and accordingly to the borehole pattern are actuated simultaneously along the longitudinal axis of the dowels so that the number of dowels of the predetermined dowel receiving head corresponding to the borehole pattern simultaneously are formed into the workpiece abutting the pusher, that is into the aligned boreholes of the workpiece. The dowel ejector rods are connected with their drive through high-speed coupling means.

For automatically filling the magazine with dowels or similar cylindrical elements according to a further embodiment of the invention a filling device is proposed for filling the magazines from the bottom, which allows an exact and continuous filling operation in such a manner that the longitudinal axes of all dowels automatically extend parallel to each other. In order to fill the magazine the bottom wall is removed and the magazine with its open bottom is placed onto a working plate provided with a filling slot the width and length of which is slightly larger than the diameter and the length of the dowels to be inserted. The dowels to be loaded into the magazine are supplied by a dowel conveyor and are brought into a position, which is in alignment with said slot underneath. The dowels in this position rest on a receiving head, which centers the dowel and is connected with a rod driven mechanically, hydraulically or pneumatically in a timely manner and which lifts the dowel substantially up to the center of the slot. With this lifting step the dowel urges two arms under tension away from each other to such an extent that it is able to enter the slot between said two arms. As soon as the dowel has moved away from the operation range of the two arms under tension the ends of the arms approach to each other so that the lifted dowel is no longer in a position to move downwards and is arranged within the slot. When lifting the next dowel the preceeding dowel is pushed into the dowel magazine, and this dowel takes the position of the preceeding dowel. By supplying dowels continuously those dowels already arranged within the magazine are distributed within the magazine so that the position of the dowels with their axes parallel to each other is maintained.

The dowel conveyor according to an embodiment of this invention is provided as a rotating disc, which towards the center preferably is conically shaped and which has a restriction wall at its peripheral direction, at which the dowels filled into the disc are automatically aligned in the peripheral direction one behind the other in one or several rows when the disc rotates. At a predetermined position of the restriction wall an aperture is provided which is the start of a tangentially extending guiding path. Said guiding path is restricted by a baffle wall, which is adjustable to dowels of different diameters. Through this aperture and along the guiding path the row of dowels is discharged from the rotating disc and is passed to the discharge point below the magazine. Supplying the dowels can be made in any other manner, if the dowels will be disposed individually one abutting the next at the discharge position so that they are shifted into the magazine from the bottom in a timed manner. In order to exactly position each dowel in its lifting position a fixed dowel stop is provided which engages the face of the incoming dowel exactly in the lifting position. Furthermore, for avoiding idle lifting strokes dowel sensing means, as for example optical means are provided in the lifting position, in order to avoid any idle strokes and to generate a signal if a dowel has reached the lifting position, which signal controls the operation mode of the dowel lifting device and thus, the rate of filling the magazine.

Other objects and features of the present invention will become apparent from the following detailed description of an embodiment of this invention where taken in conjunction with the drawings in which:

BRIEF DESCRIPTION OF THE DRAWINGS

FIG. 1 is a front view of a halving joint comprising three dowel boreholes,

FIG. 2 is a lateral view of the halving joint of FIG. 1,

FIG. 3 a schematic frontal view of the filling and dowelling means,

FIG. 4 schematically the structure of a drill bit,

FIG. 7 a lateral view of a dowelling device with dowel supplying means,

FIG. 8 a detail of a lateral view of the dowelling device,

FIG. 9 a cross section through the dowelling device according to FIG. 8 along line A-B, FIG. 10 a top view of the longitudinal and transversal stops with clamps, FIG. 11 a top view on a longitudinal stop bar in combination with the drilling and dowelling device, FIG. 12 a top view on the longitudinal stop bar according to FIG. 11, FIG. 13 a cross sectional view through the longitudinal stop bar according to FIGS. 11, 12, FIG. 14 is a lateral view of the dowel disposing means, partly in cross-section, FIG. 15 is a plan view of the disposing means according to FIG. 14, FIG. 16 is a plan view of the dowel ejecting means, FIG. 17 is a frontal view of the dowel ejecting means.

DESCRIPTION OF THE PREFERRED EMBODIMENT

Figure 6:
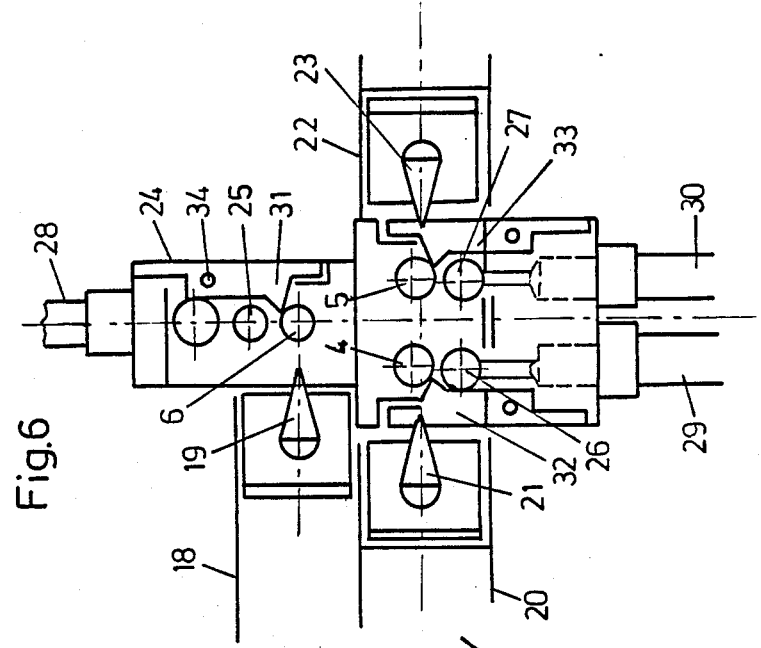
FIG. 6 a schematic top view of a dowelling device.

A halving joint 1 has a T-profile according to FIGS. 1 and 2 with a vertical stem 2 and a horizontal bar 3. Bar 3 having two boreholes 4, 5 arranged side by side and asymmetrically to the vertical longitudinal axis is longitudinally offset with respect to stem 2, and face 6 of bar 3 is tapered downwards and inwards towards stem 2. This profile of the face corresponds to the opposite profile of the frame ledge to which the halving joint is to be connected. Stem 2 has a bore hole 7 extending along its longitudinal axis. Boreholes 4, 5, 6 each receive a dowel 8, 9, which is bonded within the corresponding borehole.

As shown in FIG. 3, drilling and dowelling apparatus 10 includes the drilling aggregate 11, the dowelling aggregate 12 and the glue applying means 13 coupled with the dowelling aggregate 12; preferably blowing means such as nozzles 14 are arranged between the drilling aggregate and the dowelling aggregate for removing dust from within the boreholes as the workpiece is moved from the drilling aggregate to the dowelling aggregate. The workpiece is shifted on a sliding table 15. According to the face of the halving joint with staggered upper portion as well the drill of the drilling aggregate and also the dowel inserting elements of the dowelling aggregate are of different length.

As shown in FIG. 4 drills 16 are made in a special manner so that they have an extremely long centering tip 17, which makes sure that the drill is prevented from moving aside if the tapering areas are countered so that in this manner an exact and clean borehole will be obtained, which is necessary for an automatic dowelling operation.

Figure 5:
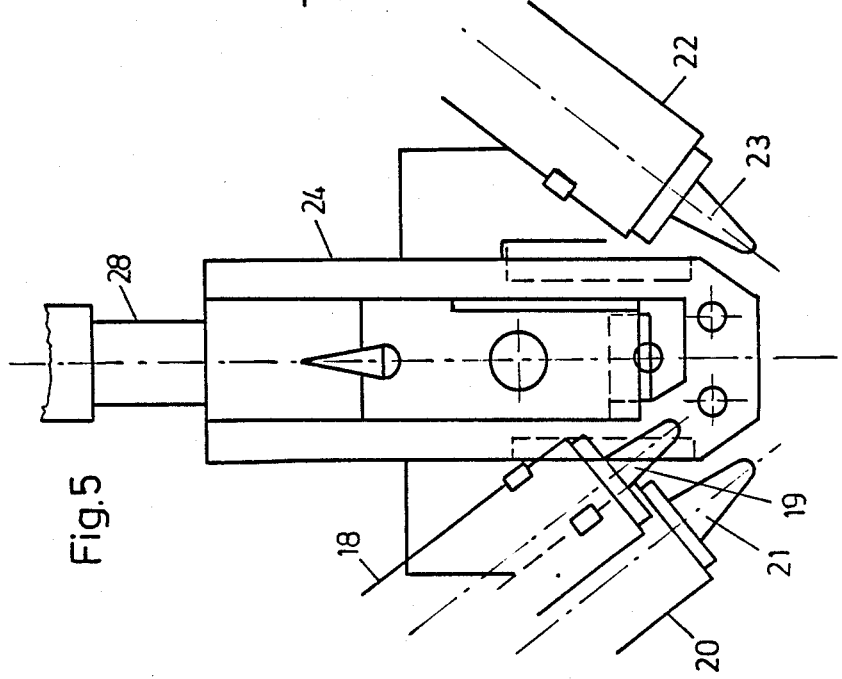
FIG. 5 a schematic front view of a dowelling device.

FIGS. 5, 6 and 7 show the basic idea of the dowelling aggregate 12. This aggregate 12 is provided with glue injecting means 18, 20 and 22 having nozzles 19, 21 and 23, respectively which are associated with the corresponding boreholes 6, 4, 5 so that they inject glue from their nozzles directly and simultaneously into boreholes, when a command signal for ejecting glue is given by the control system. The aggregate casing 24 contains all means required for dowelling. From a supply source (not shown), for example a dowel receiving hopper, the dowels are disposed at loading positions 25, 26 and 27 of the dowelling aggregate 12. From this position the dowels are passed in a controlled manner into the inserting positions, which are aligned with the boreholes 4, 5, 6. Each individual dowel is shifted from its loading position 25, 26, 27 into its inserting position 4, 5, 6 by an actuating rod 28, 29, 30; rod 28 urges the dowel downwards, whereas rods 29 and 30 urge the two corresponding dowels upwards. In order to position each dowel exactly in its inserting position locking rods 31, 32 and 33 are provided, which initially resist the movement of the dowels from the loading position into the inserting position movement of the dowel into the inserting position deflect against its spring bias; when the corresponding dowel is in the inserting position returns the pawl again into the starting position and lock the dowel. Inserting the in place into the halving joints is made by actuation rods 34, 35, 36, which by means of a pressure piston 37 are displaced the required distance in the longitudinal axis into the aligned boreholes of the halving joint. Actuating and moving the rods 34, 35, 36 for the dowel drive is caused by a pressure piston 37; the working stroke of the rods 34–36 is adjustable, for example by screw adjustment 38. FIG. 7 shows the hoses 39, 40, 41 with dowels inserted therein, which have been supplied from a dowel hopper. FIGS. 8 and 9 show a detail of the dowelling aggregate with the dowel bore holes 4, 5, 6. FIG. 9 is a cross-section along line A-B of FIG. 8.

FIG. 10 shows an embodiment of the stop means for drilling and dowelling. Table 50 is movable in a longitudinal direction within guides of a mounting bar 51, which is connected to the machine frame. 52 is a transverse stop, whereas 53 is a longitudinal stop positioned orthogonal to the transverse stop. Each stop 52 or 53 is connected with a mounting angle 56 or 57, on which clamps 58, 59 or 60, 61 are attached, which are used for fixing the workpiece 54 or 55. Arrows 62 and 63 show the adjustment means of the stops 52 and 53. Adjusting the longitudinal and the transvers stops is made simultaneously by adjusting the corresponding clamps.

As shown in FIG. 11 the machine casing 64 receives the dowelling and drilling means 10 and is attached to the table 50. At the machine frame 64 a longitudinal stop bar 67 is fastened stationary or movable in longitudinal direction by means of mountings 65 and 66; bar 67 preferably is a profile bar as shown in to FIG. 13, and is provided with guides for receiving the adjustable stops 68, 69. Furthermore, a support 70 is—preferably movably—mounted with bar 67 for receiving the workpiece W. Stops 68, 69 either can be mechanical stops or digital stops, which are known per se. Each stop comprises a guide shoe 71, which is movable and fixable within guiding channels 72 of bar 67, a horizontal bolt 73 attached to the guide shoe, and the actual stop element 74, which is pivotably fastened to the bolt 73. The extent of oscillation is restricted to the stop position. Support 70 for the workpiece W for example is an angle iron, which is fixedly or adjustably mounted to the stop bar 67. Holders 65, 66, which form the connection between stop bar 67 and machine frame 64 have lateral restrictions 75, 76, which also can be movably guided within profile bar 67 and which are used for positioning the workpiece W. The working table 50 is provided with stops of the type shown in FIG. 10. This is schematically shown with 77. In order to prepare boreholes without setting dowels a single stop 77 on table 50 will be sufficient for positioning the workpiece W at the drilling means 11.

Figure 18:
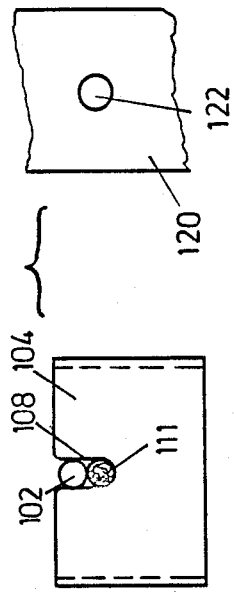
FIG. 18 is a lateral view of an embodiment of a dowel receiving head and an associated borehole pattern.
Figure 19:
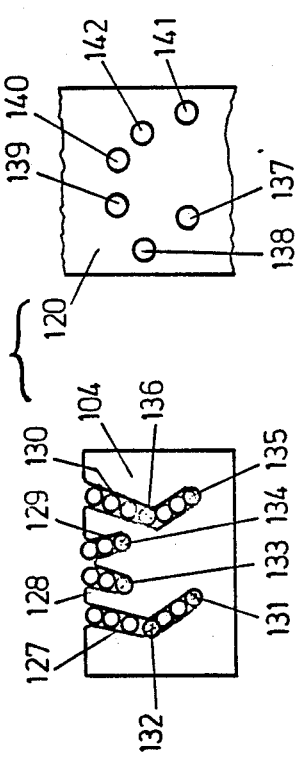
FIG. 19 is a lateral view of a second embodiment of a dowel receiving head with an associated borehole pattern.

Referring to FIGS. 14-19, a dowel magazine or alternatively dowel hopper 101 of parallelepiped shape with the width corresponding to the length of the included dowel 102 is closed by a movable bottom 103. The magazine 101 in operation is provided directly upon a dowel receiving head 104, which is provided with lateral guides 105 and 106. The dowel receiving head 104 has slot-like recesses 107, 108, 109 opposite the workpiece according to the corresponding borehole pattern; the dowels 102 drop into said recesses from the magazine under their own gravity. For example, the lowermost dowel 110, 111, 112 each (as shown in FIG. 19 any dowel of the group of dowels arranged upon each other within the slot can be used) of the slotlike recesses 107, 108, 109 takes exactly that position in which the dowels from the dowel receiving head 104 are ejected and inserted into the boreholes of the workpiece. The dowel receiving head 104 is received within a support-like or alternatively ledge-like pusher 113, which can be moved in the direction of the arrow relative to the dowel hopper 101. Workpiece 114, for example a frame portion of a window frame, is in contact with the front side of the pusher 113 and its front side is provided with boreholes 115, 116, 117, which are aligned with the dowel positions 110, 111, 112. Workpiece 114 is positioned by means of clamping devices 118, 119 at the machine frame for setting the dowels.

At the opposite side of the pusher 113 the dowel ejector 120 is arranged, the position of which is adjustable. It is provided with ejecting rods 121, 121′, 121″, which are aligned with the borehole pattern 115, 116, 117 within the workpiece 114. Said ejecting rods are guided within the ejector 120 and are combined in a plate 122, which is connected to a drive by means of a driving bar 123. The ejecting rods 121 are coupled with the plate 122 by means of springs 124. Furthermore, the driving rod 123 is connected to the dowel ejector means 120 through a high speed coupling 125 so that the exchange of dowel ejectors 120 in order to adapt the dowels to the corresponding borehole pattern can be made in a fast and simple manner. The ejector 120 is provided with a closing plate 126, which forms a guide for the ejecting rods 121 and is associated to the dowel receiving head 104.

Dowel receiving head 104 is dimensioned according to the dimensions of the dowels 102; for different types of dowels different dowel receiving heads 104 are provided, which can be inserted into the guide passages 105 and 106 of pusher 113 and are removable therefrom. If dowels of different diameters and/or different lengths are to be used the dowel hopper 101 is closed by means of the insertable bottom 103, the fastening of the hopper 101 at the machine frame is released and the dowel receiving head 104 is removed from the pusher. The dowel receiving head 104 is substituted by another dowel receiving head for a different dowel type, subsequent thereto a different dowel magazine for the required dowel type is attached, the bottom is withdrawn and then the system is ready for being operated with the new dowel type. If the borehole pattern is to be altered in addition, dowel ejector 120 is to be changed, too.

In FIGS. 18 and 19 two dowel receiving heads are provided, which refer to different borehole patterns. With the embodiment of FIG. 18 the slotlike recess 108 receives two dowels 102, 111, whereby the lowermost dowel 111 is ejected. The corresponding borehole pattern is a single borehole 122. With the embodiment of FIG. 19 four slot-like recesses 127, 128, 129, 130 are provided, which are filled with dowels. Of these dowels the ones marked with 131, 132, 133, 134, 135, 136 are urged into corresponding bore holes 137, 138, 139, 140, 141, 142 by means of correspondingly arranged dowel ejecting devices. From this picture results that with the superimposed dowels of each slot-like recess dependent on the corresponding borehole pattern different superimposed dowels are in the eject position so that not necessarily the lowermost dowel within the recess is ejected. In view of the changeability of the dowel receiving head and the dowel ejector the most different borehole patterns can be handled in an especially easy and useful manner.

Figure 20:
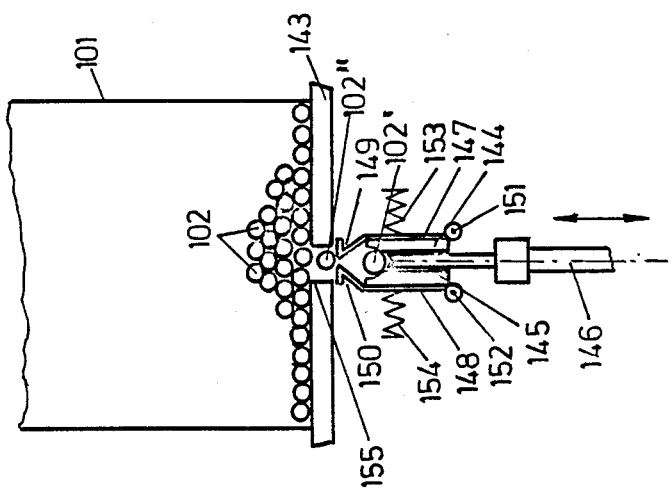
FIG. 20 is a lateral view of a dowel filling means with dowel magazine, partly in cross-section.

The purpose of the dowel filling device according to FIG. 20 is to fill dowel magazines with dowels, the magazines being dimensioned according to the length and the diameter of the dowels. Such dowel magazines 101 are attached to the device according to FIG. 14 and when emptied are replaced by full magazines. For filling the dowel magazine 101 according to FIG. 20 said magazine is attached with the bottom removed onto a working plate 143. Instead of a magazine with removable bottom—according to a different embodiment of the invention the bottom of the magazine can be shaped like a funnel with a gap at the exit through which the individual dowels for filling the magazine in a manner similar to the one described above in connection with a magazine having an open bottom can be filled from below. Underneath the working plate 143 a dowel receiving device 144 is provided, which has a central, continuous slot 145, within which a lifting rod 146 is guidedly moved up and down in time with positioning the dowels, said rod lifting the dowel 102 received from the receiving device. With the lateral restrictions of said receiving device arms 147, 148 with restrictions 149, 150 at the upper end are connected, which are pivoted at 151 and 152 in such a manner that they can be spread outwards, which means away from the receiving device, if the dowel 102 is urged upwards and away from the receiving device 144, 156 by means of the lifting rod 146. This spreading movement is opposite to the spring force of springs 153 and 154, which automatically tend to return the arms 147, 148 into the starting position as soon as the dowel 102 has left the restriction 149, 150 upwards and has taken the position within the gap 155 of the working plate 143 as shown in FIG. 20. The dowel 102 being arranged within gap 155 with the next working cycle, which means with the next dowel urged upwards, is filled into the magazine 101, whereby the dowels already arranged within said magazine are adjusted automatically parallel to each other as a result of this lifting movement and of the further dowel filled into the magazine with each new stroke. The dowels maintain their positions parallel to their axis during the entire filling operation so that the magazine is positively and correctly filled with dowels which are arranged parallel to each other within the magazine 101.

With an embodiment of the invention not shown in the drawings a device similar to the arrangement 147–154 is built into the plate 143 itself at the gap 155 in the form of a spring pressure device restricting the gap when in the inactive position, however, widening the gap when urging a dowel through the said gap and subsequent thereto closing the gap again so that said dowel will not be able to fall downwards through the gap.

Figure 21:
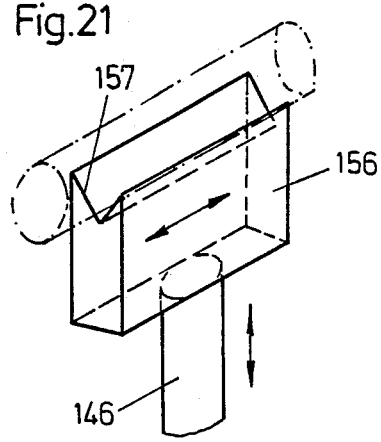
FIG. 21 is a three-dimensional view of an embodiment of a dowel lifting means.

The dowel receiving and lifting device 144, 156 is shown perspectively in FIG. 21. The receiving head 156 connected with the lifting rod 146 is guided within the receiving device 144 and is formed as a cubelike element, the length of which substantially corresponds to the length of a dowel 102 and the width of which is adapted to the diameter of a dowel 102 so that the V-shaped upper side 157 of the element 156 receives a dowel 102 centrically. For different dowel diameters and different dowel lengths one and the same head member 156 can be used, because the dowel in the V-shaped support area 157 is correctly centered and because the dowel receiving head 156 and the lifting rod 146 can be adjusted together in the direction of the longitudinal axis of the dowel supporting area 157 in order to allow an adaption to different dowel lengths. The dowel receiving head 156 also can be formed so that the receiving device 144, which according to FIG. 20 surrounds the actual lifting device 156 can be dispensed with and the arms 147, 148 with their pivot points 151, 152 are fastened directly at the head 156.

Figure 22:
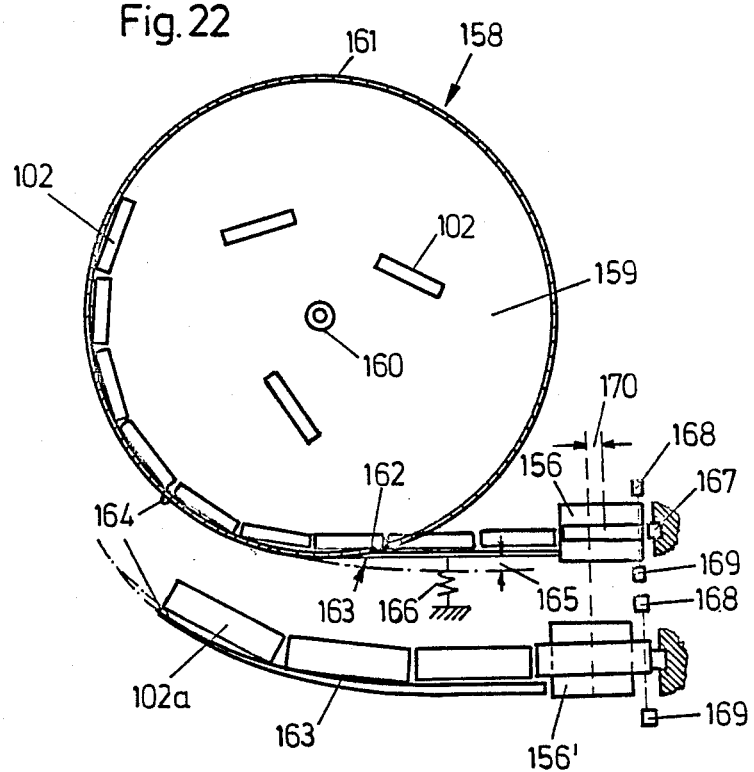
FIG. 22 is a schematic top view of an embodiment of a dowel feeding and conveying means for filling magazines.

The individual dowels 102 are brought into the position marked with 102' in FIG. 20, from which position they are lifted into the dowel magazine, are moved into the exact lifting position by means of a dowel conveyor, which for example is formed as shown in FIG. 22 as a rotational disc 158 the surface 159 of which is tapered and has a tip 160, in which a driving shaft rotating the disc 158 is supported. Disc 158 is provided with a peripheral wall 161; the dowels 102, which are filled into the disc in random manner are positioned against this wall one behind the other by means of the centrifugal force acting when rotating the disc 158 so that at least at the restriction wall 161 a continuous row of dowels is formed. The disc wall 161 is open at 162 so that the dowels with the disc rotating leave the disc at this location. In order to guide the dowels 102 leaving the disc 58 a guide rail 163 is provided, which forms a guide passage for the dowels 102 and transports the row of dowels one after the next into the lifting position 102' of the lifting device 156. The guide rail 163 joins the peripheral wall 161 tangentially and is connected with the peripheral wall 161 through a pivot point 64 in order to allow the discharge opening 162 according to the diameter of the disposed dowels to be opened more or less. The difference in the width of opening is marked by arrow 165. Guide rail 163 is provided with adjustment means 166, which hold the guide rail in the adjusted position; as a matter of simplification calibration means for the width of opening are provided for different dowel diameters. The dowels 102 take their exact position 102' within the lifting device 156 when arriving from the conveyor 158; in this position the front end of the dowel 102' is in contact with stop means 167 of the lifting device. At both sides of the lifting device 156 sensing elements 168 and 169 are provided, which can be mechanical, optical, electrical etc. type and which determine whether the front end of the dowel 102' is in contact with the stop 167. It is only in this case that the dowel 102' has taken the position required for the lifting operation. Sensing elements 168 and 169 in this case signal that the lifting rod or the lifting means can be actuated. For different lengths of dowels the exact lifting position is a different one, as shown in FIG. 22, bottom, where dowels 102a of greater length are schematically shown the front ends of which in their position for the lifting movement also are in contact with stop 167, however, extend from the lifting means backwards in view of their greater length. In this case the lifting device 156 is adjusted in the longitudinal axis of the dowel to such an extent that seem along the longitudinal axis the centre of the dowel 102a and the centre of the lifting area coincide so that in view of the positioning of a dowel 102' an adjustment for a distance 170 is made either manually or automatically.

I claim:

1. An apparatus for automatically drilling holes in wooden workpieces for the manufacture of lattice frame closures, for ejecting glue into the holes, and for introducing dowels into the holes, comprising
   means for drilling plural holes in said members,
   at least two means for inserting dowels into said holes, and
   a like number of means for injecting glue into said holes,
   said inserting and injecting means being simultaneously operable,
   each of said inserting and injecting means being aligned with a respective one of said holes.

2. The invention of claim 1, wherein the injecting means are adjustable in angular or lateral position.

3. The invention of claim 1, wherein each dowel inserting means is connected to a dowel supply by a respective hose, and further comprising transfer means for moving the dowels into the dowel inserting means, each said inserting means comprising a driving rod for pushing the dowel into a corresponding hole in the member.

4. The invention of claim 3, further comprising locking means disposed between said transfer means and said inserting means, said locking means clamping and locking the dowel in its inserting position, said locking means being a pivotable lever with a locking member pretensioned against the dowel under spring pressure, and whereby the locking means of one unit are operable together.

5. The invention of claim 1, wherein said drilling means comprises at least two drills for drilling said holes an adjustable distance apart, each of said drills being provided with a long centering tip.

6. The invention of claim 1, wherein said apparatus comprises a frame, and further comprising a movable table attached to said frame, said table being provided with longitudinal and transverse stops for clamping the workpieces during drilling and doweling operations.

7. The invention of claim 1, further comprising a longitudinal stop fixed to the machine frame, said stop being provided with mechanical stop elements for adjusting the workpiece, and a movable table having a transverse stop, said stop being automatically adjustable and movable along a line extending between the drilling device and the dowel inserting device.

8. The invention of claim 1, wherein the drilling, inserting and injecting devices are arranged so at to be movable relative to the workpiece, and further comprising means for automatically adjusting the position of each during operation thereof, and for returning each to its starting position after said operation.

9. The invention of claim 6, further comprising a plurality of workpiece holders associated with the stops, said holders being adjustable and movable together with the stops.

10. The invention of claim 6, further comprising a longitudinal stop bar attached to the machine frame, said bar having longitudinally adjustable stops, workpiece positioning elements, and at least one workpiece support.

11. The invention of claim 10, wherein the longitudinal stop bar is a profile bar having interior longitudinal guides.

12. The invention of claim 10, wherein the stops are provided with guiding shoes which can be moved within guide passages of the longitudinal guide bar and can be clamped thereto.

13. A method of controllably inserting dowels from a magazine into boreholes of a workpiece for subsequent connecting to another workpiece, comprising steps of
filling a magazine with dowels,
inserting the magazine into a loading device in such a way that the bottom of the magazine is disposed above a dowel receiving head with a dowel discharge postion of the magazine aligned with recesses in the receiving head,
transferring a plurality of dowels into discharge positions in said recesses, and
driving said dowels longitudinally from their discharge position into said boreholes.

14. The invention of claim 13, wherein during the transferring step, movement of the dowels into the recesses is controlled so that the dowels are transferred in a predetermined sequence.

15. The invention of claim 13, wherein the dowel receiving head is reciprocatingly moved relative to the bottom of the magazine in order to receive the discharge of dowels therefrom.

16. The invention of claim 3, further comprising a step of providing different sizes of magazines and receiving heads for different sizes of dowels, and different receiving heads and ejectors for different borehole patterns.

17. A method of filling a dowel magazine having a bottom slot therein, comprising a step of feeding a series of dowels to a transfer location below the magazine by a conveyor disposed below the magazine, and then lifting the dowel through the slot individually in sequence, while preventing the dowels being inserted into the magazine from moving backwards.

18. An apparatus for loading dowels into a magazine and for controllably inserting said dowels from the magazine into boreholes in a workpiece, comprising
a magazine for containing dowels arranged parallel to each other and removably attached to the loading device by means of a changing device,
a dowel receiving head replaceably arranged below the magazine, said heading having apertures aligned in an ejecting direction with the boreholes of the workpiece into which the dowels are to be inserted, and
a dowel ejecting device comprising a plurality of ejecting rods aligned with the apertures, said rods being movable in their axial direction.

19. The invention of claim 18, wherein the bottom of the magazine can be withdrawn so that in an operating position of the magazine with the bottom withdrawn, the dowels rest directly upon the dowel receiving devices and may drop into the dowel receiving apertures thereof.

20. The invention of claim 18, wherein the receiving head is provided with a pusher which can be reciprocated relative to the dowel magazine in a direction transverse to the longitudinal axis of the dowels within the magazine in a timed manner.

21. The invention of claim 20, wherein the pusher comprises spaced vertical walls and the dowel receiving device comprises a block of material movably retained between said walls, the dowel receiving head being provided with open slots for receiving the dowels, which slots extend continuously from one lateral wall to the other at the upper side thereof, the slots being configured so that at predetermined positions one dowel of each slot is arranged in the ejecting position, and the width of each slot being chosen so that the dowels can move downwards independently, and wherein the position of the corresponding dowel to be ejected within the slot is such that the dowels to be ejected in their position are in alignment with the borehole pattern.

22. An apparatus for filling a magazine according to claim 18 in order to receive dowels or the like by means of an automatically operating dowel supply conveying means, wherein the magazine bottom is provided with a slot of a width larger than the dowel diameter and a length greater than the dowel length, wherein below said slot a time-controlled dowel lifting means is provided, which urges dowels fed individually by a dowel supply conveyor to a transfer location below the slot in a timed manner through the slot into the magazine, and wherein clamping means are provided, which form a constricted gap below the slot, which gap widens with the passage of the positioned dowel and its movement into the slot and which narrows again as soon as the dowel has left the gap upwards so that the dowel is prevented from retrograde movement.

23. The invention of claim 22, wherein the dowel lifting means comprise a lifting piston having a centering area for positioning the dowel, and wherein the lifting piston has a longitudinal extension parallel to the longitudinal axis of the dowel as well as a length substantially equal to the length of a dowel.

24. The invention of claim 22, wherein the lifting piston is movable in the longitudinal direction of the dowel and is adjustable to dowels of different lengths.

25. The invention of claim 22, wherein the dowel supply conveying means comprises a driven rotary disc, having at its peripheral edge a tangential outlet for the dowels arranged at the peripheral wall in a row and joining each other, and further comprising a baffle plate for passing the dowels from the outlet to the dowel transfer location.

26. The invention of claim 25, wherein the baffle plate is adjustable so that it can be adapted to different dowel diameters.

27. The invention of claim 25, comprising stop means, at which the face of the dowels in the lifting position is engaged.

28. The invention of claim 25, wherein the lifting means is provided with sensing means for locating the front end of the positioned dowel, for giving a signal to the lift control means for lifting the lift piston together with the dowel, when a dowel is available.

* * * * *